United States Patent [19]

Cielo et al.

[11] Patent Number: 5,056,922
[45] Date of Patent: Oct. 15, 1991

[54] METHOD AND APPARATUS FOR MONITORING THE SURFACE PROFILE OF A MOVING WORKPIECE

[75] Inventors: Paolo Cielo; Marc Dufour, both of Montréal; Mario Lamontagne, Longueuil, all of Canada

[73] Assignee: Canadian Patents and Development Limited/Societe Canadienne des Brevets et D'Exploitation Limitee, Ottawa, Canada

[21] Appl. No.: 306,386

[22] Filed: Feb. 6, 1989

[30] Foreign Application Priority Data

Feb. 26, 1988 [CA] Canada .................................. 559913

[51] Int. Cl.$^5$ ........................................... G01B 11/24
[52] U.S. Cl. ........................................ 356/376; 356/1
[58] Field of Search ............... 356/376, 372, 375, 377, 356/380–381, 385–386, 429–431, 1, 4; 250/216, 222.2, 559, 571, 560–561; 350/169, 171; 362/257, 297, 317, 346

[56] References Cited

U.S. PATENT DOCUMENTS

| | | | |
|---|---|---|---|
| 3,671,726 | 6/1972 | Kerr | 356/381 |
| 4,188,544 | 2/1980 | Chasson | 250/560 |
| 4,238,147 | 12/1980 | Stern | 356/376 |
| 4,248,532 | 2/1981 | Nosler | 356/1 |
| 4,534,650 | 8/1985 | Clerget et al. | 356/376 |
| 4,541,723 | 9/1985 | Pirlet | 356/376 |
| 4,673,817 | 6/1987 | Oomen | 356/376 |
| 4,809,147 | 2/1989 | Negishi | 362/346 |

FOREIGN PATENT DOCUMENTS

| | | | |
|---|---|---|---|
| 1042087 | 11/1978 | Canada | 340/123.4 |
| 1074102 | 8/1980 | Canada | 33/63 |
| 1116717 | 1/1982 | Canada | 340/123.4 |

OTHER PUBLICATIONS

Cielo, P., and Lamontagne, M., "Improvement of Sub-pixel Resolution in Triangulation Ranging by Astigmatic Spot Projection and Wide-Aperture Line Array Imaging," Optics and Laser Technology, vol. 20, pp. 19–24.

Primary Examiner—Richard A. Rosenberger
Assistant Examiner—Hoa Pham
Attorney, Agent, or Firm—Foley & Lardner

[57] ABSTRACT

An optical inspecting apparatus and the method thereof, including a series of optical units for rapidly acquiring the three-dimensional surface profile of a moving object. Each optical unit contains a multiple-beam light source to project a number of luminous spots on the object surface which are imaged through a properly oriented line-array camera. The surface position on both sides of the object, and thus the object thickness, is inferred at the position of each luminous spot from an analysis of their camera image. The projected luminous spots are preferably elliptically shaped and the line array elements are elongated in a direction perpendicular to their longitudinal axis in order to reduce speckle and other optical noise. The described optical configuration results in a superior performance in terms of spatial resolution and response speed.

13 Claims, 6 Drawing Sheets

METHOD AND APPARATUS FOR MONITORING THE SURFACE PROFILE OF A MOVING WORKPIECE

FIELD OF THE INVENTION

The invention relates to a method and an apparatus for monitoring the surface profile of a moving workpiece at different positions along this workpiece. More particularly, the present invention relates to a method and an apparatus for on line monitoring the three-dimensional thickness profile of an elongated moving workpiece. Thickness information on a moving product must often be available in many industrial processes, such as in cold or hot rolling steel mills, polymer sheet extruders, or in lumber sawmills to optimize the board value output.

BACKGROUND OF THE INVENTION

A number of possible methods are available for thickness monitoring. Two of the best known approaches use ultrasonic thickness ranging or nuclear-radiation attenuation measurements. Problems with the ultrasonic approach are the need for a good liquid coupling between the transducer and the inspected materials, as well as variations of the acoustic velocity and a high attenuation in the media under consideration. As to the X-ray technique, problems are related to a limited response speed, reduced transverse resolution, high price and safety questions. Other methods using tactile sensors or microwaves do not possess the required resolution.

Optical techniques are the most widely used methods for three-dimensional surface profiling. Apart from the time-of-flight ranging approach which is presently limited to depth resolutions of the order of 1 cm, optical techniques are essentially based on triangulation. This method consists in the projection of a light beam forming a luminous spot on the surface whose position is to be measured. By viewing the projected spot from an angle, one can evaluate the depth of the surface from the apparent position of the spot image.

To produce a three dimensional profile of the workpiece, a number of triangulation units can be aligned along the longitudinal axis of the elongated workpiece to collect top and bottom surface height information at specified spatial intervals while the object is moved at uniform speed in the transverse direction, as it is described in U.S. Pat. No. 3,671,726 by Kerr. A single laser source in conjunction with a number of beam splitters can be used to obtain the required number of projected beams.

The spatial resolution which can be obtained in this case along the longitudinal direction is limited to the spatial interval between projected spots which must be at least equal to the size of the projection and detection units. This results in a relatively coarse sampling distance along the longitudinal direction. Furthermore, each detection unit including a number of optical and electronic components is devoted to the evaluation of a single spot position. A large number of units must consequently by used to scan a relatively long workpiece, leading to a relatively high cost of the overall system.

A different approach is described in U.S. Pat. No. 4,188,544 by Chasson. In this case a number of light stripes is projected across the transverse direction of the workpiece. Each stripe is imaged through a separate mirror on a specific portion of the sensitive area of a two-dimensional video camera. Hence, only one viewing device is required to view a multitude of projected stripes.

This second approach presents a number of drawbacks. First, a single camera must be focused to view several stripes situated at different distances from the camera. Parts of the image seen by the camera will thus be out of focus, unless the camera aperture is strongly reduced at the expense of the overall image brightness. The laser power must be spread over a stripe rather than being concentrated on single spots as in the case mentioned above. The laser power must be correspondingly increased to reach a sufficiently high light intensity, thus raising eye safety objections. Finally, and most importantly, this approach is severely limited in terms of speed. In a typical $480 \times 600$ pixel CCD camera, the time required to scan the full two-dimensional image is normally 1/30 second. Substantial workpiece displacement may take place in several industrial processes during such a period, resulting in image blurring. To avoid such problems one must resort to complex mechanical systems or to high-peak-power pulsed laser beams, further increasing eye safety concerns. Moreover, the requirement to process the huge amount of nearly $3 \cdot 10^5$ bytes of image information during each 1/30 second is very demanding in terms of computing power and overall cost.

It is an object of the present invention to provide an apparatus and a method for monitoring the position of a surface of a moving workpiece in a safe and efficient manner.

SUMMARY OF THE INVENTION

According to the present invention, there is provided an optical inspecting apparatus for monitoring the surface profile of a moving workpiece at different positions along said workpiece, comprising at least one optical unit including:

a light projecting system for illuminating discrete points on a first surface of said workpiece by projecting more than one discrete coplanar light beams, each of said more than one discrete light beams being projected at a different angle of incidence; and light detecting means for imaging said illuminated points on said first surface, said light detecting means including optical means for gathering light beams reflected from said first surface, and optoelectronic means for detecting each of said light beams gathered by said optical means and generating electrical signals accordingly, said electrical signals being indicative of said surface profile at different positions along said first surface.

According to the present invention, there is also provided an optical inspecting method for monitoring the surface profile of a moving workpiece at different positions along said workpiece, comprising the following steps:

a) projecting more than one discrete coplanar light beams onto discrete points of a first surface of said workpiece, each of said more than one discrete light beams being projected at a different angle of incidence;

b) gathering light beams reflected from said first surface;

c) detecting each of said light beams gathered in step b); and d) generating electrical signals according to each of said light beams detected in step c), said electrical signals being indicative of the surface profile at different positions along said first surface.

The objects, advantages and other features of the present invention will become more apparent upon reading of the following non restrictive description of preferred embodiments thereof, given for the purpose of exemplification only with reference to the accompanying drawings.

DETAILED DESCRIPTION OF PREFERRED EMBODIMENTS

Figure 1:
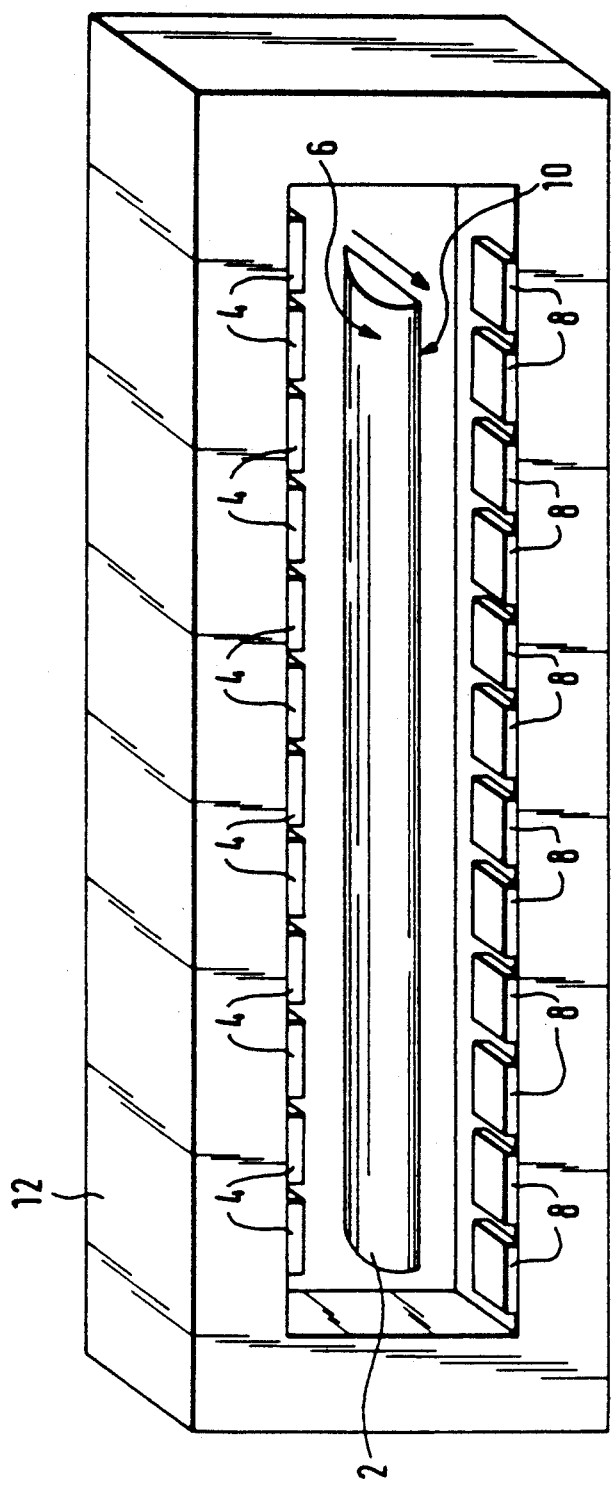
FIG. 1 is a view in perspective of one embodiment of an apparatus for monitoring the thickness of a moving workpiece according to the present invention.

In FIG. 1, there is shown an optical inspecting apparatus for monitoring the opposite surface profiles of a moving workpiece at different positions along said workpiece 2 from which the thickness of the workpiece 2 can be evaluated. The apparatus comprises several optical units 4 which monitor the position of a first surface 6 on one side of the workpiece along its whole length. The apparatus also comprises a second series of optical units 8 which monitor the position of the second surface 10 on the opposite side of the workpiece along its whole length.

The optical units are supported by a frame structure 12. The workpiece 2 moves in the direction indicated by the arrow adjacent to the workpiece 2. The basic principle of this apparatus is shown in the FIG. 1. A number of optical units 4 and 8 are aligned along the length of the workpiece 2 which is moving at a controlled speed in a direction perpendicular to its longitudinal axis as shown by the arrow. Each optical unit produces several light beams that are projected on the workpiece 2 and reflected from it. Adjacent optical units may be alternatively displaced from a common longitudinal line to avoid cross interferences between adjacent light beams from different optical units.

As the workpiece 2 advances, the profile of the surface facing each of the optical units 4 and 8 is evaluated. Typically, twelve optical units 4 and 8 are disposed along the longitudinal direction of the workpiece 2 to project a total number of 72 light beams on one side the workpiece. If the illuminated spots are spaced at 10 cm intervals on the surface, up to 7.2 meters-long workpieces can be inspected. If the workpiece 2 is moving at 1 m/s and one reading of data is collected at a frequency of 500 Hz, the workpiece will move by 2 mm between two subsequent readings. The workpiece profile will thus be sampled at distances of 10 cm along the length of the workpiece and of 2 mm in the transverse direction of the workpiece 2. Such a sampling configuration is adequate for nearly cylindrical workpieces, whose surface profile fluctuations are small in the longitudinal direction as compared to the transverse direction of the workpiece 2.

Figure 2:
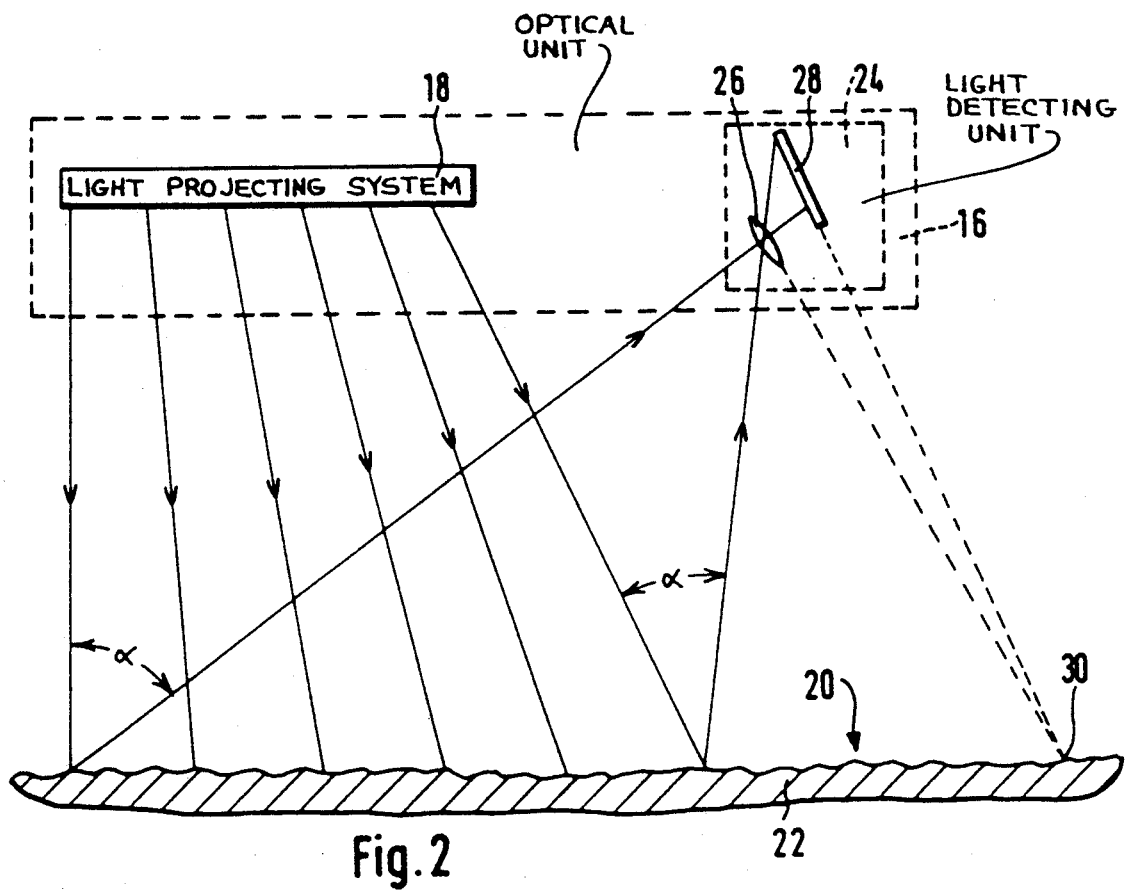
FIG. 2 is a schematic diagram of an optical unit of the apparatus shown in FIG. 1 with a partial view of the workpiece.

Referring now to FIG. 2, there is shown an optical unit 16 according to the present invention. The optical unit 16 comprises a light projecting system 18 for illuminating six discrete points on the surface 20 of said workpiece 22 by projecting six discrete coplanar light beams. Each discrete light beam is projected at a different angle of incidence. The optical unit also comprises a light detecting unit 24 for detecting light beams reflected from the surface 20. The light detecting unit 24 includes an optical device 26 for gathering light beams reflected from the surface 20, and an optoelectronic device 28 for detecting each of the light beams gathered by the optical device 26 and generating electrical signals accordingly. The electrical signals are indicative of the surface profile at different positions along the surface 20.

A number of light beams is projected on the workpiece surface 20 by the light projecting system 18. The reflected light beams are viewed by a light detecting unit 24 which is a one-dimensional camera. The optical device 26 is an objective lens. The optoelectronic device 28 is a line-array detector. The objective lens and the line-array detector are aligned so that the projection of their axes intersects at a point 30 on the workpiece surface 20. Such a configuration ensures that all of the projected spots along the surface 20 are imaged in sharp focus on the line-array detector.

All of the projected light beams, as well as the axis of the line-array detector, are lying in the same plane which corresponds to the plane of FIG. 2. Consequently, the image of each light beam will be formed within the sensitive area of the line-array detector no matter what is the shape of the workpiece 22. This is the reason why a one-dimensional line-array detector can be used in our case to scan an array of light beams, rather than a two-dimensional camera.

Figure 3:
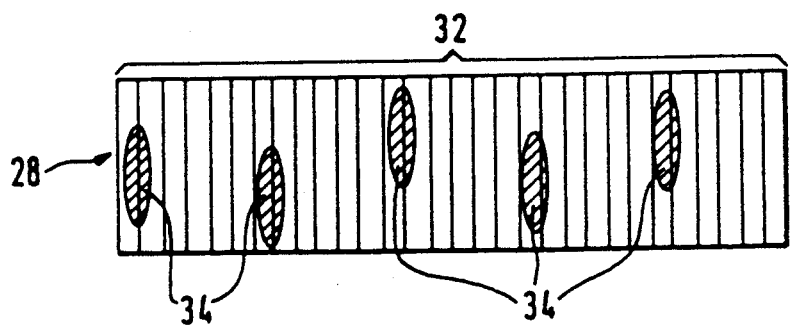
FIG. 3 is a front view of the detecting elements of the optical unit shown in FIG. 2.

Referring now to FIG. 3, there is shown the optoelectronic device 28 which is a one-dimensional detector having detecting elements 32 disposed in one linearray. Also shown are the images 34 of the light spots projected on the workpiece surface.

The detecting elements 32 are elongated in a direction perpendicular to the longitudinal axis of the detector. Each of the projected light spots preferably has an elliptically shaped cross section to maximize the light power collected by each detecting element 32 of the detector.

The coplanarity of the projected beams is limited to the available precision of the mechanical assembly. Nevertheless, this configuration is little affected by small deviations of the projected beams from the plan provided that a wide aperture line-array detector as shown in FIG. 3 is used. These kinds of arrays, such as the model RL1024SAQ produced by EGG-Reticon (trademark), contain an array of sensing elements of aperture much larger than their center-to-center distance. Small departures of the light beams positions from the axis of the line-array detector can be accepted in this case. Mechanical alignment requirements are considerably relaxed, thus reducing the overall cost of the mechanical assembly as well as the reliability of the device in the presence of thermally induced structural strain.

Figure 4:
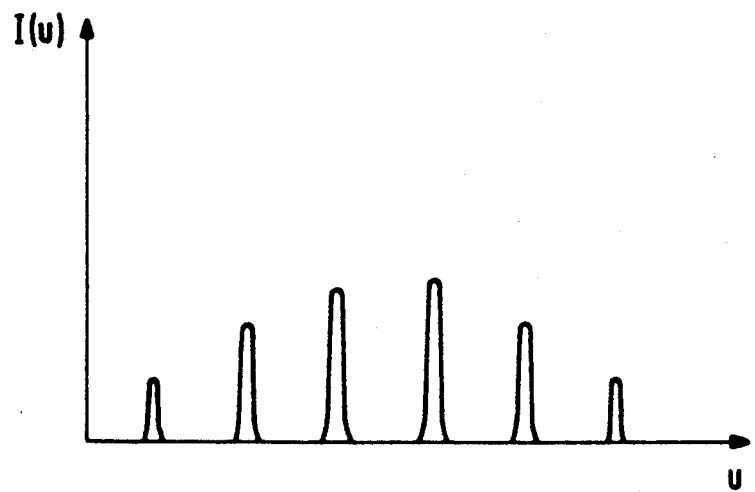
FIG. 4 illustrates an example of an output signal generated from the detecting elements shown in FIG. 3.

Referring now to FIG. 4, there is shown an example of the output signal generated from the detecting elements shown in FIG. 3. The vertical axis indicates the signal amplitude, and the horizontal axis indicates the position along the line-array detector. An array of 6 pulses is shown corresponding to the images of 6 reflected light beams. The position of each pulse in the FIG. 4 corresponds univocally to the position of the corresponding light spot on the workpiece surface. If the surface moves up or down, the pulse positions in the line-array output will move correspondingly. The distance between an optical unit and the inspected surface can be calculated from the position of the pulses by using known triangulation equations, as long as the projection angle $\alpha$ for each projected light beam is known. The projection angle $\alpha$ is the angle between an incident beam and the corresponding reflected beam as shown in FIG. 2. More empirically, the system can be calibrated by inspecting two plane workpieces of extreme thickness values. The position of each spot image is recorded for the two workpieces, and the range between these values is divided according to the thickness difference between the two workpieces.

Figure 5:
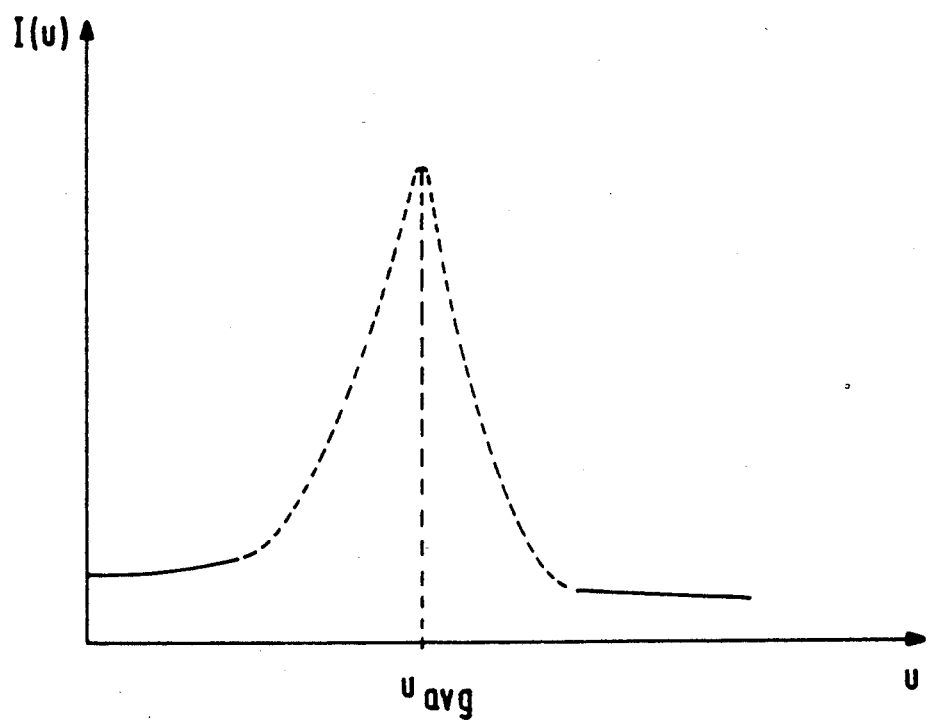
FIG. 5 illustrates in more detail one of the peak signal shown in FIG. 4.

Referring now to FIG. 5, there is shown in more detail one of the peak signals shown in FIG. 4. From the preceding discussion it will be understood that the position of each spot image must be located very precisely to obtain a good depth accuracy. As the pulses in the line-array output have a finite width due to the width of the projected spot as well as the aberrations of the imaging optics, this means that the center of each pulse must be located with high precision. One algorithm for determining such a position uses the expression of the center of gravity which is:

$$\mu \text{ avg} = \frac{\Sigma i \mu_i I(\mu_i)}{\Sigma i I(\mu_i)}$$

where $\mu_i$ is the position of the i-th element along the array detector and $I(\mu_i)$ is the amplitude of the signal detected by this element, while $\Sigma$ is a summation symbol.

If the pulse is smooth and symmetrical, this value for the center of gravity corresponds to the maximum of the pulse. Other algorithms can be used for pulse localization, such as the convolution of the output signal with a pulse matching the average shape of the imaged spots.

In order to minimize the error in the evaluation of the spot center of gravity, the shape of the recorded pulses must be relatively constant under variable conditions. Unfortunately, the shape of such pulses may vary considerably when different portions of the workpiece surface are illuminated.

Two main causes for such variations are the fluctuations of the surface reflectivity within the area illuminated by a single light spot, as well as speckle effects under coherent illumination.

Figure 6A:
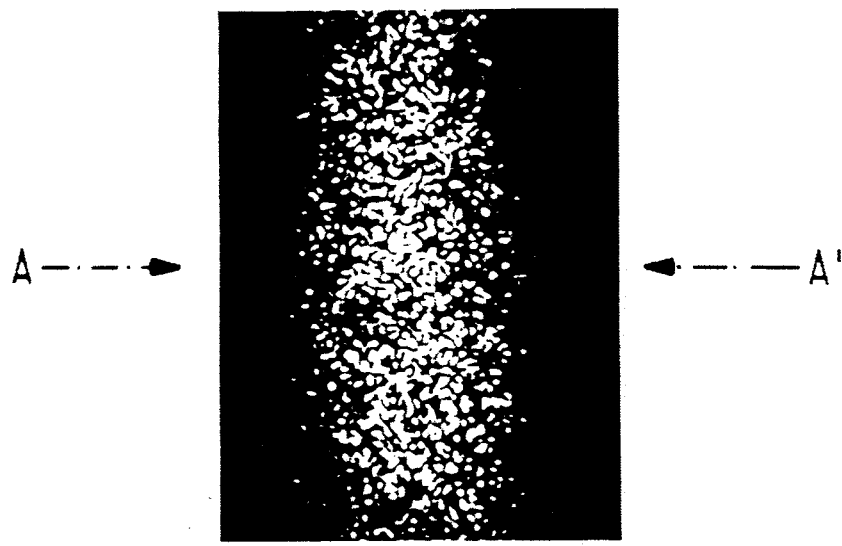
FIG. 6a illustrates an image of a light spot detected by the detecting elements shown in FIG. 3 under laser illumination showing speckle effects.
Figure 6B:
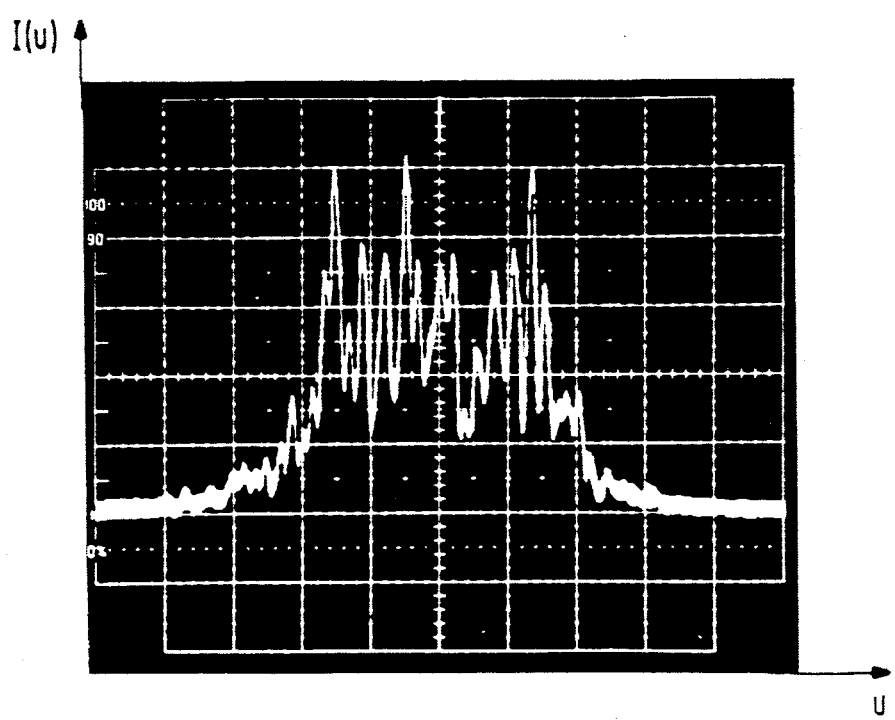
FIG. 6b illustrates the light intensity distribution of FIG. 6a along section AA'.

Referring now to FIGS. 6a and 6b, there is shown respectively an image of a light spot detected by the detecting elements shown in FIG. 3 under laser illumination showing speckle effects, and the light intensity distribution of FIG. 6a along section AA'. The speckle patterns visible in this Figure, which is an enlarged photo of a light spot image of the kind shown in FIG. 3, are highly contrasted as shown by the light intensity profile across the transverse section AA' shown in the FIG. 6b. Because such speckle patterns are strictly dependent on the microstructural surface morphology of the illuminated area, the noisy spikes in the FIG. 6b are completely different if another portion of the surface is illuminated. The average error in the calculation of the center of gravity of a pulse of the kind shown in FIG. 6a and 6b would thus be much larger.

The reason why it is possible to obtain with this apparatus a smooth and constant pulse shape as shown in FIG. 4 relates to the choice of a wide-aperture line-array detector as well as to the elliptical pattern of the projected light beams as shown in FIG. 3. Such a light beam minimizes the width of the spot along the axis of the line-array detector, and thus the width of the pulse, while maximizing the area of the surface which is illuminated by a single light beam. Consequently, each of the elongated sensing elements shown in FIG. 3 will integrate a large number of speckle grains within the light spot image so that the total light intensity collected by each sensing element will be a smooth function of the light spot position.

The light projection system must provide a number of coplanar light beams suitably oriented to provide equally spaced light spots of uniform brightness over the inspected surface. If the projected beams have equal intensities, the distribution of the spot intensities seen by the line-array detector will normally be of the kind shown in FIG. 4. The apparent brightness of the peripheral spots will be smaller than the brightness of the central ones which are seen at a nearly specular angle of reflection. This effect reduces the visibility of the peripheral pulses over a uniformly distributed noise in the detector output.

To counteract this problem and equalize the amplitudes of the pulses in the line-array output, it is possible to increase the intensity of the peripheral projected beams to compensate the effect of specular reflections. Separate light sources of different powers can be used to produce the light beams represented in FIG. 2, the peripheral sources having a higher power than the central ones.

Figure 7:
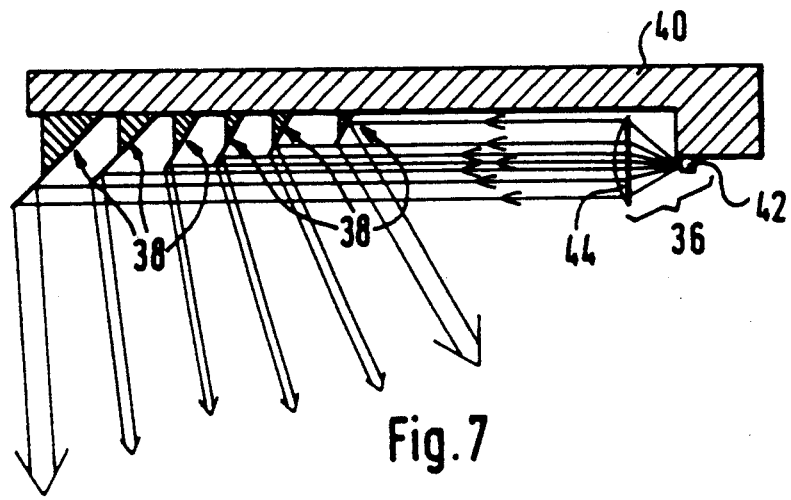
FIG. 7 is an elevation of an embodiment of the light projecting system shown in FIG. 2.

Referring now to FIG. 7, there is shown an alternative embodiment of the light projecting system shown in FIG. 2. In the embodiment of FIG. 7, the discrete coplanar light beams are projected so that the beams projected onto peripheral portions of the surface have a higher intensity than the beams projected onto the central portion of the surface of the workpiece. This light projecting system comprises a collimated light source 36 for projecting a unique light beam. The light projecting system also comprises more than one sequentially spaced mirrors 38, each mirror 38 having a different reflecting area or partial reflectivity so that the discrete coplanar light beams projected onto peripheral portions of the surface of the workpiece have a higher intensity than discrete coplanar light beams projected onto the central portion of the surface. Each mirror 38 has also an appropriately chosen angle so that the distance between each of the discrete points projected on the surface is regular.

The collimated light source 36 and the mirrors 38 are supported by a solid member 40. The collimated light source comprises a light source 42 and a lens 44 for collimating the light emitted by the light source 42.

Figure 8:
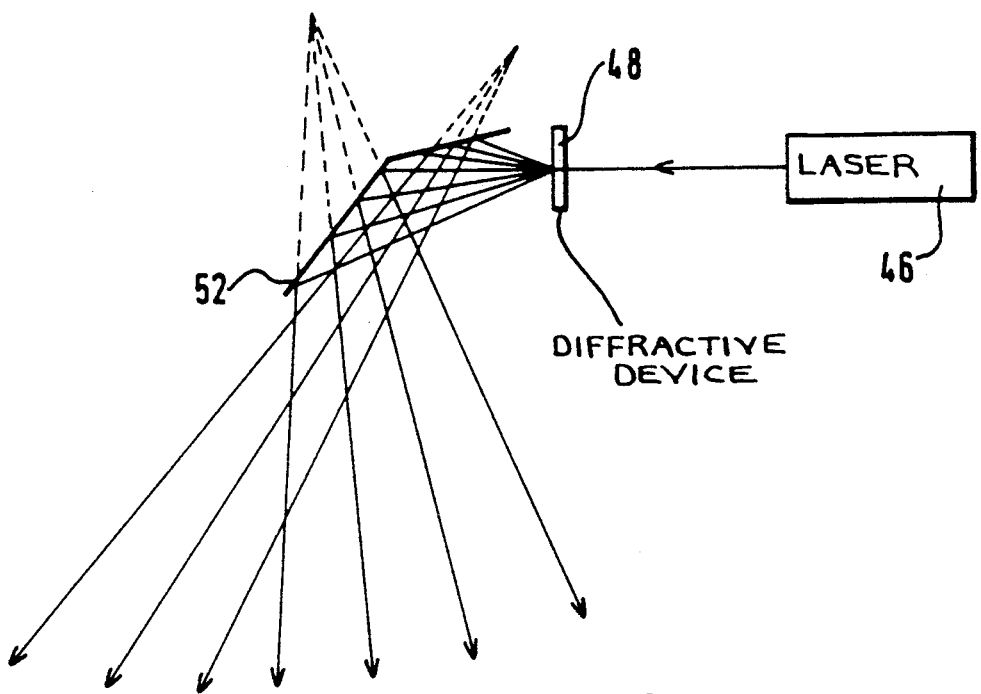
FIG. 8 is an elevation of another embodiment of the light projecting system shown in FIG. 2.

Still another embodiment of the light projecting system is shown in FIG. 8. The light projecting system shown in FIG. 8 comprises a laser source 46 for projecting a laser beam, and a diffractive device 48 for diffracting the laser beam in a diverging pattern of light beams. The light projecting system also comprises a reflecting device 52 having two reflecting surfaces for receiving light beams from the diffractive device 48 and projecting onto peripheral portions of the surface discrete coplanar light beams having a higher intensity than discrete coplanar light beams projected onto the central portion of the surface. The reflecting surfaces are positioned so that the central light beams of the pattern are projected onto the peripheral portions and the peripheral light beams of the pattern are projected onto the central portion of the surface.

This embodiment is particularly convenient when a large number of projected spots is required.

The laser beam is split into several beams by the diffractive device 48, each beam corresponding to one of the diffraction orders produced by the diffractive device 48. It will be recalled that the angular separation between the diffracted orders is inversely proportional to the spatial period of the diffractive device 48. It is also well known that the intensity of the beams diffracted from a diffractive device usually decreases from the central beam to the beams diffracted at progressively larger angles. By using two reflecting surfaces, it can be seen that the distribution of the projected beams is reversed, the beams diffracted at larger angles being directed to the center of the projected light spot array and vice versa. The nonuniformity of the diffracted beam intensities is thus compensated by the nonuniformity of the beam reflectivities toward the line-array detector.

FIG. 1 shows a workpiece with sharp edges. This may not be always true, in some cases a workpiece with rounded edges may have to be scanned. In this case the silhouette of the workpiece, or its contour as seen from the top, should be recorded with a precision, along the longitudinal axis of the workpiece, better than the four inch distance between two laser spots along such an axis.

Figure 10:
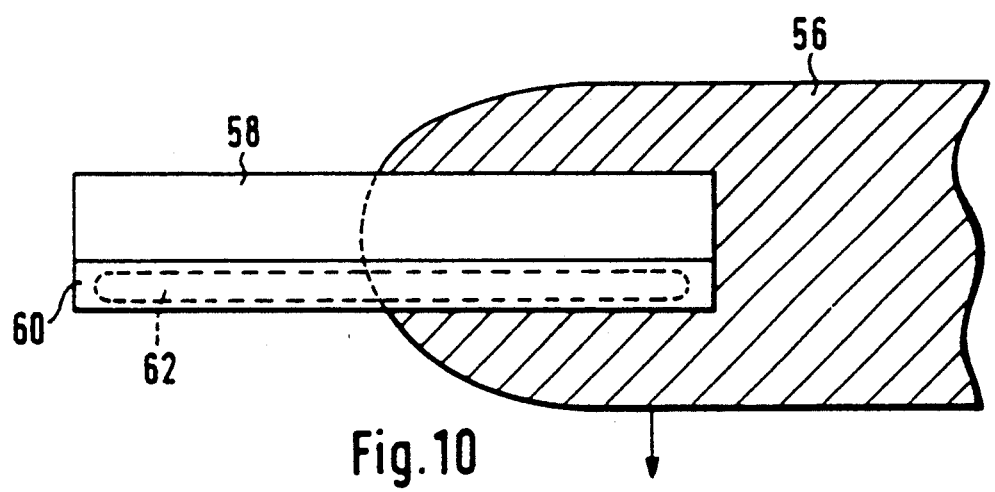
FIG. 10 is a view from above of the apparatus shown in FIG. 9 with a partial view of the moving workpiece.
Figure 9:
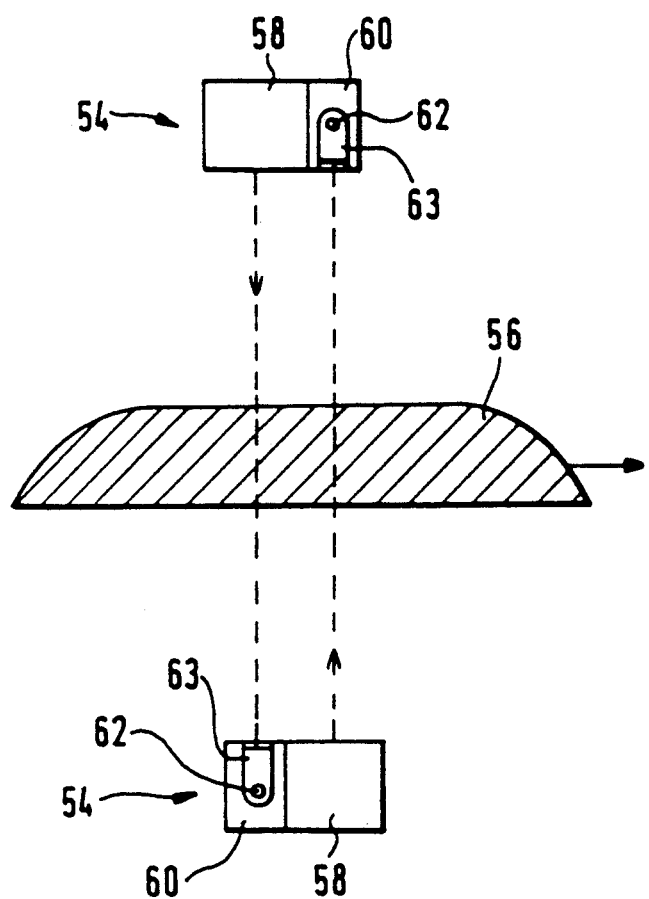
FIG. 9 is the side view of another embodiment of an apparatus for monitoring the position of a surface of a moving workpiece.

In FIGS. 9 and 10, there is shown two optical units 54 of the optical inspecting apparatus that are directed above and below one lateral edge of the workpiece 56. These optical units 54 include light projecting systems 58 for projecting the discrete coplanar light beams onto discrete points of the workpiece surface. The optical units 54 further comprise a light source providing a brightly illuminated background against which the contour of the lateral edge of the workpiece can be sharply recorded. The light source 60 includes an elongated lamp 62. The elongated lamp 62 is elongated in a direction perpendicular to the direction in which the workpiece moves, and along the surface of the workpiece. The elongated lamp 62 may be a quartz-halogen or fluorescent lamp which is inserted in a reflecting cavity and illuminates a diffusing screen 63 elongated in the direction of the longitudinal axis of the workpiece 56.

In the absence of the workpiece, the detecting elements of one optical unit are pointed directly toward the diffusing screen of the opposite optical unit, giving a uniformly bright background output. When part of the light projected by the elongated lamp 62 is intercepted by the workpiece 56, this background is partially obscurated by the workpiece 56, the transition between the bright and the dark region in the line-array output corresponding to the position of the workpiece edge. As the workpiece 56 moves, the edge position recorded at subsequent moments in time gives the complete contour of the lateral edge of the workpiece. The information defining the contour is thus obtained with minimum equipment additions and without affecting the depth profiling function. Very reduced reflected light noise is added to the array detector output corresponding to the workpiece surface where the light spots are projected.

As it can be seen on FIG. 9, the detecting elements of the two optical units 54 are not collinear. A time delay must, consequently, be introduced between the recorded top and bottom surface positions before calculating the thickness profile. This can be conveniently performed by software signal processing procedures well known by persons ordinarily skilled in the state of the art.

The present invention effectively overcomes the problems introduced in the beginning of the present disclosure by resorting to a multiple-beam configuration where each single line-array detector produces an image of an array of projected light spots. The line-array detector and the projected light beams are coplanar so that a large number of luminous spots may be located during a single line scan of the line-array detector which can take place in less than $10^{-3}$ seconds. The distance between the projected spots is no longer limited by the physical size of the projection or detection units, so that a high spatial resolution can be obtained in the longitudinal direction at a limited cost. Each spot is concentrated in a small area rather than being spread over a strip, so that relatively low power, eye safe light sources can be employed. Being unidimensional, the line-array device can be chosen to have a relatively large aperture in the transverse direction in order to relax alignment requirements, maximize the signal level for a given light projection power and minimize speckle and variable reflectivity noise. Finally, the signal from each line-array detector can be easily processed to extract spot position information for each array of projected spot. This local data reduction considerably reduces the overall amount of data to be processed in real time.

The embodiments of the invention in which an exclusive property or privilege is claimed are defined as follows:

1. An optical inspecting apparatus for monitoring the surface profile of a moving workpiece at different positions along said workpiece, comprising at least one optical unit including:

a light projecting system for illuminating discrete points on a first surface of said workpiece by projecting more than one discrete coplanar light beams, each of said light beams having an elliptically shaped cross section with a longer axis being perpendicular to a longitudinal axis of a single one-dimensional detector; and light detecting means for imaging said illuminated points on said first surface, said light detecting means including an objective lens for gathering light beams reflected from said first surface, and said single one-dimensional detector having detecting elements disposed in one line array, the longitudinal axis of said detector being coplanar with said more than one coplanar light beams, said detecting elements being elongated in a direction perpendicular to the longitudinal axis of said detector, said detector having an output indicative of the surface profile at different positions along said first surface.

2. An optical inspecting apparatus according to claim 1, wherein said light projecting system comprises optical projecting means for projecting said more than one discrete coplanar light beams so that discrete coplanar light beams projected onto peripheral portions of said first surface have a higher intensity than discrete coplanar light beams projected onto the central portion of said first surface.

3. An optical inspecting apparatus according to claim 2, wherein said optical projecting means comprise:
a collimated light source for projecting a unique light beam;
more than one sequentially spaced mirrors having different reflecting surfaces characterized by different reflective properties so that said discrete coplanar light beams projected onto peripheral portions of said first surface have a higher intensity than discrete coplanar light beams projected onto the central portion of said first surface, each mirror having also an appropriately chosen angle so that the distance between each of said discrete points is regular.

4. An optical inspecting apparatus according to claim 2, wherein said optical projecting means comprise:
a laser source for projecting a laser beam;
diffractive means for diffracting said laser beam in a diverging pattern of light beams; and
reflecting means having two reflecting surfaces for receiving light beams from said diffractive means and projecting discrete coplanar light beams having a higher intensity onto peripheral portions of said first surface than discrete coplanar light beams projected onto the central portion of said first surface, said reflecting surfaces being positioned so that the central light beams of said pattern are projected onto said peripheral portions and the peripheral light beams of said pattern are projected onto said central portion.

5. An optical inspecting apparatus according to claim 1, wherein at least one optical unit monitors the surface profile of said first surface on one side of said workpiece, and at least one optical unit monitors the surface profile of a second surface on the opposite side of said workpiece so that the thickness of said workpiece can be monitored along certain portions of said workpiece.

6. An optical inspecting apparatus according to claim 5, wherein said first surface is monitored along the whole length of the workpiece, and said second surface is also monitored along the whole length of the workpiece.

7. An optical inspecting apparatus according to claim 6, wherein each optical unit projects six discrete coplanar light beams.

8. An optical inspecting apparatus according to claim 5, wherein one of said at least one optical unit is directed above one lateral edge of said workpiece, said apparatus further comprising a light source directed below said one lateral edge for providing a brightly illuminated background against which the contour of said one lateral edge is recorded by the light detecting means of said one optical unit.

9. An optical inspecting apparatus according to claim 8, wherein said light source is an elongated lamp, said lamp being elongated in a direction perpendicular to the direction in which said workpiece moves, and along said second surface.

10. An optical inspecting method for monitoring the surface profile of a moving workpiece at different positions along said workpiece, comprising the following steps:
a) projecting more than one discrete coplanar light beams onto discrete points of a first surface of said workpiece, each of said light beams having an elliptically-shaped cross-section with a longer axis perpendicular to a longitudinal axis of a single one-dimensional detector;
b) gathering light beams reflected from said first surface by means of an objective lens;
c) detecting each of said light beams gathered in step b) by means of said single one-dimensional detector having detecting elements disposed in one line array, the longitudinal axis of said detector being coplanar with said more than one coplanar light beams, said detecting elements being elongated in a direction perpendicular to the longitudinal axis of said detector; and
d) generating an output from said detector, indicative of the surface profile at different positions along said first surface.

11. A method according to claim 10, wherein the step a) of projecting comprises the step of varying the intensity of each of said more than one discrete light beams projected in view of one another so that discrete coplanar light beams projected onto peripheral portions of said first surface have a higher intensity than discrete coplanar light beams projected onto the central portion of said first surface.

12. An optical inspecting method according to claim 10, wherein:
said step a) further comprises a step of projecting more than one discrete coplanar light beams onto discrete points of a second surface of said workpiece, said second surface being opposite to said first surface;
said step b) further comprises a step of gathering light beams reflected from said second surface by means of a second objective lens;
said step c) further comprises a step of detecting each of said light beams gathered in step b) from said second surface by means of a second single one-dimensional detector having detecting elements disposed in one line array, the longitudinal axis of said second detector being coplanar with said more than one coplanar light beams projected onto said second surface; and
said step d) further comprises a step of generating an output from said second detector, indicative of the surface profile at different positions along said first and second surfaces so that the thickness of said workpiece between said first and second surfaces can be evaluated.

13. An optical inspecting method according to claim 10, wherein said first surface is adjacent to one lateral edge of said workpiece, said method further comprising the steps of:
i) providing on one side of said workpiece a brightly illuminated background against which the contour of said one lateral edge can be recorded;
ii) detecting light emitted from said contour on the other side of said workpiece;
iii) generating electrical signals responsive to the light detected during step (ii), said electrical signals generated during step (iii) being indicative of the contour of said lateral edge.

* * * * *